United States Patent [19]

Johnson

[11] Patent Number: 5,477,378
[45] Date of Patent: Dec. 19, 1995

[54] MULTIPLE CRYSTAL NON-LINEAR FREQUENCY CONVERSION APPARATUS

[75] Inventor: Bertram C. Johnson, Sunnyvale, Calif.

[73] Assignee: Spectra-Physics Lasers, Inc., Mountain View, Calif.

[21] Appl. No.: 289,052

[22] Filed: Aug. 11, 1994

[51] Int. Cl.$^6$ .................................................... G02F 1/39
[52] U.S. Cl. .............. 359/326; 359/330; 372/22
[58] Field of Search ................................... 359/326–332; 385/122; 372/20–23

[56] References Cited

U.S. PATENT DOCUMENTS

| | | | |
|---|---|---|---|
| 3,962,576 | 6/1976 | Kuhl et al. | 359/325 X |
| 4,272,694 | 6/1981 | Jacobs | 359/329 |
| 4,346,314 | 8/1982 | Craxton | 359/329 |
| 4,510,402 | 4/1985 | Summers et al. | 359/329 |
| 4,897,562 | 1/1990 | Krasinski et al. | 359/330 |
| 5,034,951 | 7/1991 | Edelstein et al. | 372/22 |
| 5,047,668 | 9/1991 | Bosenberg | 359/330 |
| 5,084,879 | 1/1992 | Suzuki et al. | 372/22 |
| 5,117,126 | 5/1992 | Geiger | 359/330 |
| 5,168,503 | 12/1992 | Maeda | 372/22 |
| 5,249,190 | 9/1993 | Kortz et al. | 372/22 |
| 5,260,953 | 11/1993 | Rowe | 372/20 |
| 5,274,650 | 12/1993 | Amano | 372/21 |

*Primary Examiner*—John D. Lee
*Attorney, Agent, or Firm*—Haynes & Davis

[57] ABSTRACT

A non-linear frequency conversion device is tunable over a wide tuning range. An input source provides a first input beam with a frequency $\lambda 1$. A first frequency conversion crystal has an input beam face that is cut at a phase matching angle $\theta 1$ and is positioned on a first stage at a stage angle $\alpha 1$. The first frequency conversion crystal provides frequency conversion of the input beam of frequency $\lambda 1$ to a selected frequency $\lambda 2$ of a first portion of the selected tuning range. A second frequency conversion crystal has an input beam face that is cut at a phase matching angle $\theta 2$ and is positioned on a second stage at a stage angle $\alpha 2$. The second frequency conversion crystal provides frequency conversion of the input beam from a frequency $\lambda 1$ to a selected frequency $\lambda 3$ of a second portion of the selected tuning range. Only one of the frequency conversion crystals provides frequency conversion in the range for a particular input wavelength, while the other crystal is inactive, and serves as a beam displacement compensator. The non-linear frequency conversion device can be used for second harmonic generation, sum frequency mixing, difference frequency mixing, or optical parametric generation.

33 Claims, 8 Drawing Sheets

MULTIPLE CRYSTAL NON-LINEAR FREQUENCY CONVERSION APPARATUS

BACKGROUND OF THE INVENTION

1. Field of the Invention

This invention relates to a non-linear frequency conversion apparatus, and particularly to a non-linear frequency conversion apparatus with two frequency conversion crystals, with only one crystal providing frequency conversion for a selected portion of a tuning range, while the other serves as a beam displacement compensator.

2. Description of the Related Art

Non-linear optical devices, such as harmonic generators and parametric devices, provide a method of extending the frequency range of available input beams from coherent sources such as lasers. Frequency conversion is a useful technique for extending the utility of high power lasers. It utilizes the non-linear optical response of an optical medium in intense radiation fields to generate new frequencies. It includes both elastic, optical-energy-conserving, processes, such as harmonic generation, and inelastic processes, such as stimulated Raman or Brillouin scattering.

There are several commonly used elastic processes. Frequency doubling, tripling, and quadrupling generate a single harmonic from a given fundamental high-power source. The closely related processes of sum and difference frequency generation also produce a single new wavelength, but require two high power sources. These processes have been used to generate high power radiation in all spectral regions, from the ultraviolet to the far infrared. Optical parametric devices and amplifiers generate two waves of lower frequency. They are capable of generating a range of wavelengths from a single frequency source, in some cases spanning the entire visible and near infrared regions.

High efficiency second harmonic conversion depends on parameters which are related to the input beam source, such as power density, beam divergence, and spectral line width, and parameters associated with the harmonic generator, such as the value of the non-linear coefficient, crystal length, angular and thermal deviation from the optimum operating point, absorption, and inhomogeneities in the crystal.

An effective method of providing equal phase velocities for the fundamental and second harmonic waves in the non-linear medium utilizes the fact that dispersion can be offset by using the natural birefringence of uniaxial or biaxial crystals. These crystals have two refractive indices for a given direction of propagation, corresponding to the two allowed orthogonally polarized modes. When the phase mismatch between the fundamental wave and the second harmonic wave for collinear beams is zero index phase matching occurs.

The parameters of the harmonic generator which affect doubling efficiency are temperature, phase matching angle, absorption, optical homogeneity, non-linear coefficient and figure of merit.

Current devices for frequency converting tunable sources, including but not limited to dye lasers, Ti:sapphire lasers and optical parametric devices, use a single non-linear crystal or a set of non-linear crystals. The number and type of crystals used depends on the non-linear materials' phase matching properties and the wavelength ranges being covered.

By way of specific example, to frequency double the signal (~400–700 nm) and/or the idler (700–800+ nm) of an optical parametric device in order to generate second harmonic output from ~200 to ~400 nm, most of the tuning range can be covered by using just two Type I cut BBO crystals, and each is rotated over a fairly modest, 10–15 degrees, angular range. The BBO crystal provides frequency conversion, and a second optic is utilized as a beam displacement compensator to cancel out beam translation effects. The crystal is rotated to maintain the proper phase matching angle while the compensator is counter rotated to cancel out beam translation effects. In many instances, some form of automatic tracking is incorporated to keep the crystal angle optimized as the system is tuned. If the angular range available from a single crystal is insufficient to cover the desired tuning range, then a new crystal with a different angular cut is substituted into the beam path to extend the second harmonic generation tuning range.

There are additional limitations to current frequency conversion devices. One limitation is that it has not been possible to obtain crystals with large enough apertures, to achieve a wide range of tuning.

The use of two crystals in a stacked optical parametric oscillator has been reported in U.S. Pat. No. 5,177,126 (the "'126 patent"). In the '126 patent, two crystals are disposed in the optical path between a mirror and an output coupler. The two crystals operate independently and produce two wavelengths simultaneously. Both crystals are simultaneously active, performing the same function.

There is a need to provide, a frequency conversion device that tunes over a wide range of frequencies without substituting and exchanging one crystal cut at a certain phase matching angle for another crystal cut at a different angle. Additionally, it would be desirable to provide a frequency conversion that uses two crystals to simplify wide tuning, with only one crystal being active at any one time, and the other crystal serving as a beam displacement compensator.

SUMMARY OF THE INVENTION

An object of the invention is to provide a frequency conversion device that is tunable over a wide range of frequencies.

Another object of the invention is to provide a frequency conversion device that is tunable over a wide range of frequencies, and does not require removal and substitution of one conversion crystal for another one cut at a different phase matching angle.

Still a further object of the invention is to provide a frequency conversion device that is tunable over a wide range of frequencies, and does not require a large and costly frequency conversion crystal.

Yet another object of the invention is to provide a frequency conversion device with two frequency conversion crystals, each cut at a different stage angle.

Another object of the invention is to provide a frequency conversion device with two frequency conversion crystals, each cut at a different phase-matching angle, with one crystal providing frequency conversion over a first set of tuning ranges, and the second crystal providing frequency conversion over a different second set of tuning ranges.

Still a further object of the invention is to provide a frequency conversion device with two frequency conversion crystals, each cut at a different phase-matching angle, with only one crystal providing frequency conversion over a selected set of tuning ranges, while the other crystal provides compensation for beam displacement.

Another object of the invention is to provide a frequency conversion device with two frequency conversion crystals, with only one being active for a selected tuning range, and the frequency conversion device is capable of providing second harmonic generation, sum frequency mixing, difference frequency mixing, or incorporated in an optical parametric device.

These and other objectives of the invention are achieved in a non-linear frequency conversion device that is tunable for a selected tuning range. The device includes an input source that provides a first input beam of frequency $\lambda 1$ along an optical axis. Two frequency conversion crystals are also included, with only one being active in the frequency conversion process for a defined portion of the selected tuning range, while the other serves as a beam displacement compensator in an inactive status. A first frequency conversion crystal has an input beam face cut at a phase matching angle $\theta 1$ and is positioned on a first stage at a stage angle $\alpha 1$. The first frequency conversion crystal provides frequency conversion to a selected frequency $\alpha 2$ within a first section of the selected tuning range. A second frequency conversion crystal, with an input beam face cut at a phase matching angle $\theta 2$, is positioned on a second stage at a stage angle $\alpha 2$. The second frequency conversion crystal provides frequency conversion to a selected frequency $\lambda 3$ in a different second section of the selected tuning range.

Only one of the frequency crystals is active for a particular section of the tuning range. The two crystals may have an overlap frequency conversion section in the tuning range but only one of the crystals is selected to provide frequency conversion for all of the overlap region, or a portion of the overlap region.

The frequency conversion device of the invention is suitable for second harmonic generation, sum frequency mixing, difference frequency mixing, and optical parametric generation.

Each frequency conversion crystal can be made of the same or different materials. In one embodiment, the crystals are mounted on separate stages which are synchronized. Each is capable of synchronized rotational movement on its stage.

The invention provides for a division of the frequency conversion over the selected tuning range between the two frequency conversion crystals so that only one is active for a region of the range, and the other is inactive, but serves as a beam displacement compensator. Additionally, one frequency conversion crystal can perform all or some of the different frequency processes over a region of the range, while the other crystal is active for a different region of the range. There is no need to physically disrupt the frequency conversion device by removing the frequency conversion crystal and substituting a different one in its place in order to provide tuning over a broad range.

DETAILED DESCRIPTION OF THE PREFERRED EMBODIMENTS

Figure 1:
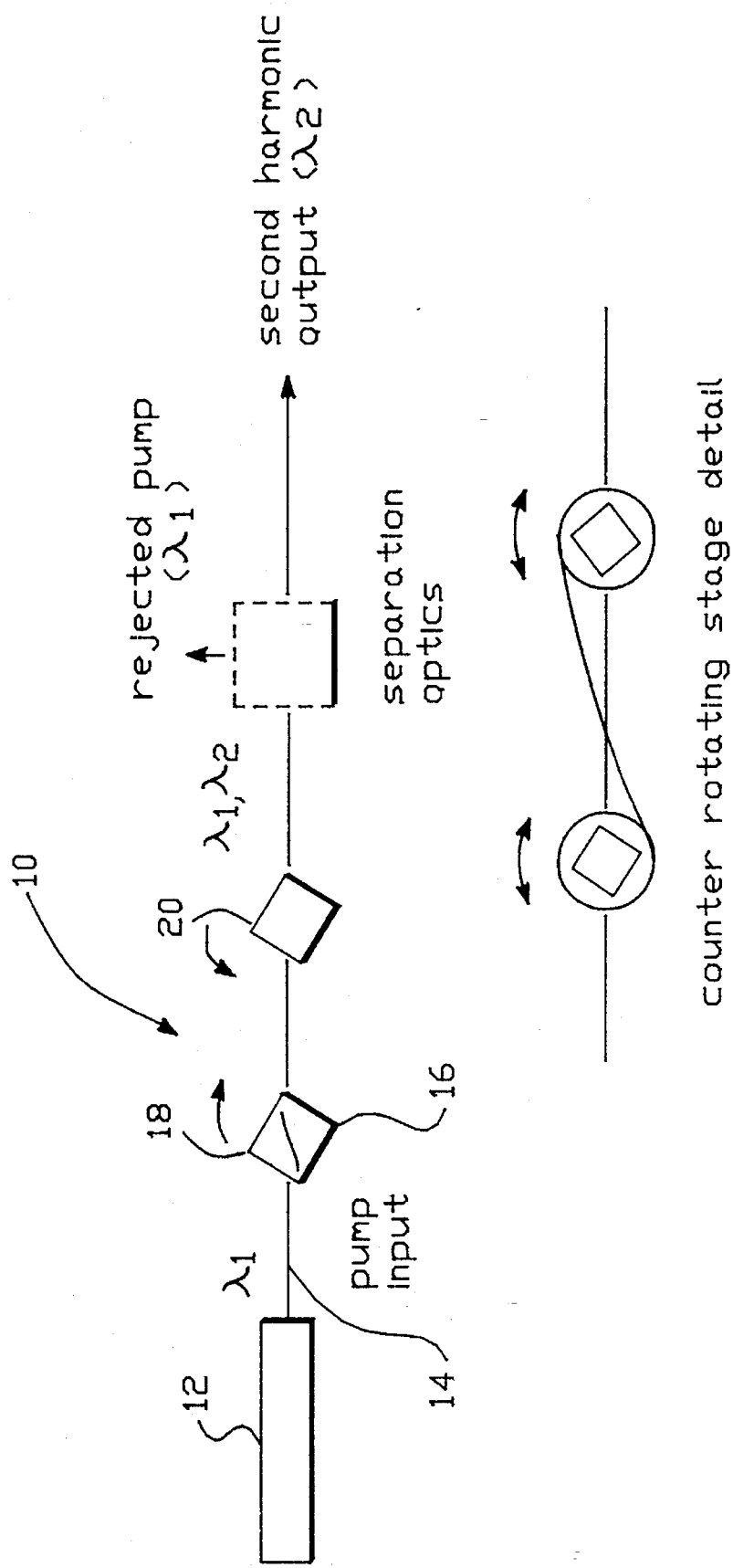
FIG. 1 is a schematic diagram of a prior art frequency conversion device.

FIG. 1 illustrates a conventional, prior art frequency conversion device 10. A coherent pump source 12 produces an input signal 14 with a frequency $\lambda 1$. A frequency conversion crystal 16 has an input beam face 18 that is cut at a phase angle $\theta 1$. Positioned adjacent to frequency conversion crystal 16 is a beam displacement compensator element 20. Frequency conversion crystal 16 converts $\lambda 1$ to $\lambda 2$. For a wide tuning range, such as 450 nm$\geq \lambda 2 \geq$225 nm, it is necessary to physically remove frequency conversion crystal 16 and replace it with another crystal that is cut at a different phase angle.

Figure 2:
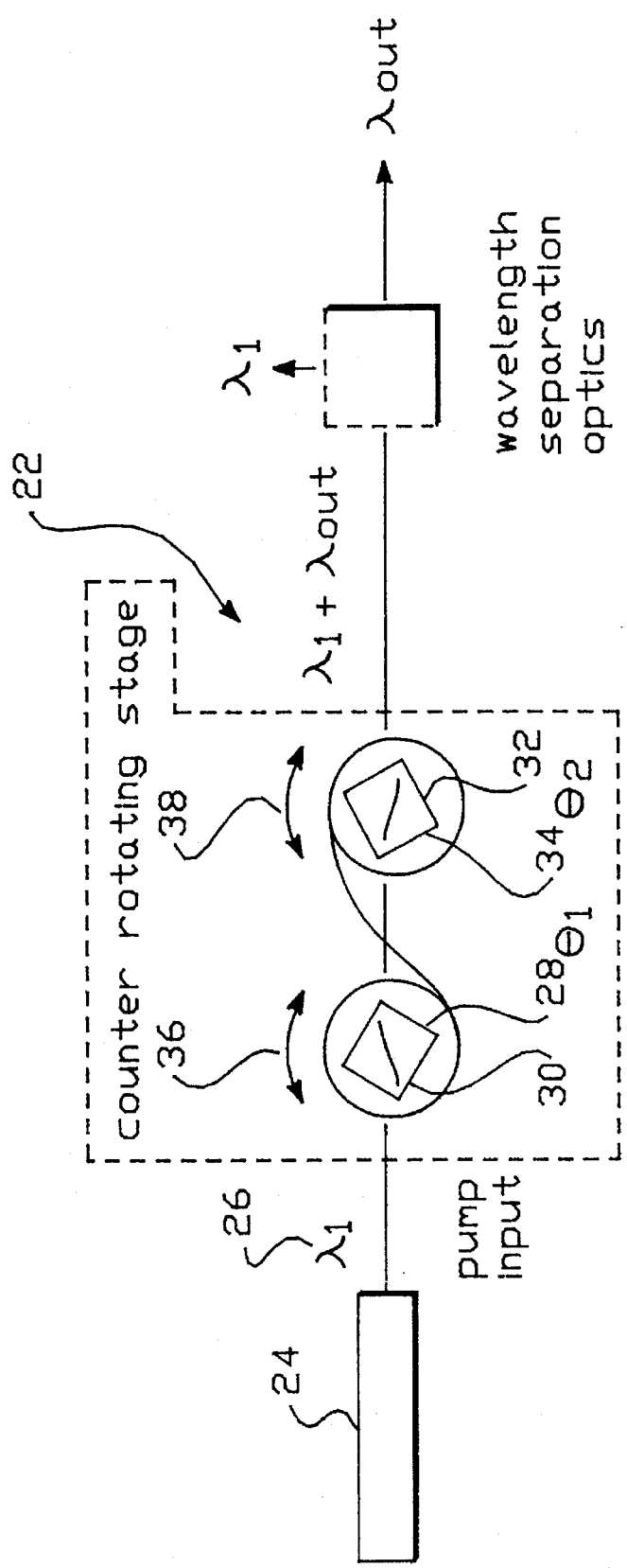
FIG. 2 is a schematic diagram of a frequency conversion device of the invention with two frequency conversion crystals.

Referring now to FIG. 2, a frequency conversion device 22 of the invention includes two or more frequency conversion crystals and provides selective tuning over a broad range. An input source 24 produces an input beam with frequency $\lambda 1$. A first frequency conversion crystal 28 has an input beam face 30 that is cut at a phase matching angle of $\theta 1$. Crystal 28 provides frequency conversion of $\lambda 1$ to $\lambda 2$ for a first section of the selected tuning range. A second frequency conversion crystal 32 has an input beam face 34 that is cut at a phase matching angle of $\theta 2$. Crystal 32 provides frequency conversion of $\lambda 1$ to $\lambda 2$ for a different second section of the selected tuning range. The first and second tuning ranges may overlap, and only one of the crystals performs frequency conversion for all or part of the overlapped range, as more fully described hereafter.

Figure 4:
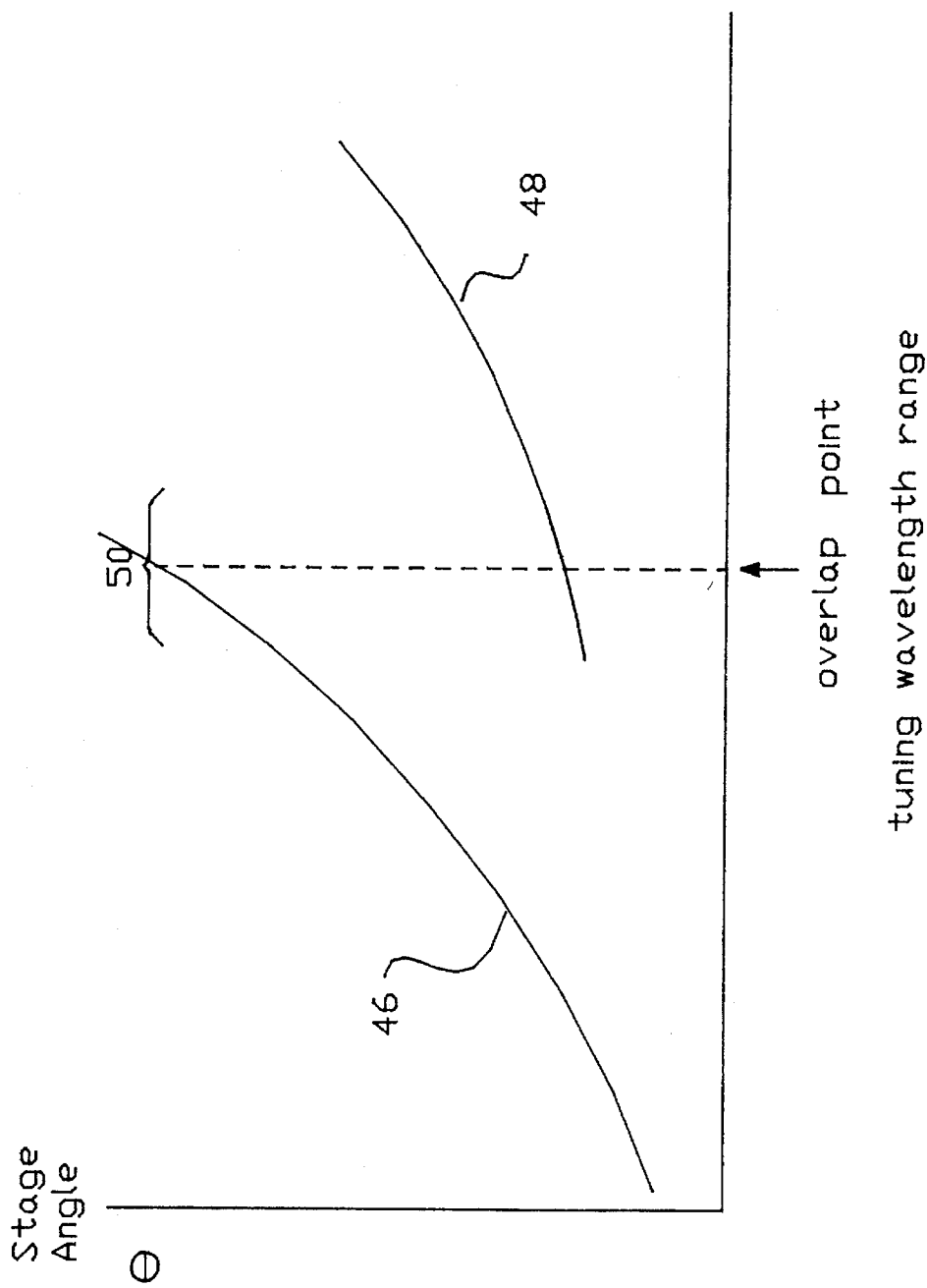
FIG. 4 is a graphical representation showing that in the desired tuning range there can be an overlap region of the first and second sections of FIG. 3.

Crystals 28 and 32 are each mounted on rotatable stages 36 and 38 at stage angles $\alpha 1$ and $\alpha 2$ respectively. Stages 36 and 38 are counter rotating so that the relative movements of crystals 28 and 32 are coordinated. For each particular stage angle and input wavelength $\lambda 1$, there is a unique, single value relationship to the phase matching angle in one of the two crystals as illustrated in FIG. 4.

Only one of the crystals 28 or 32 is active, or performing frequency conversion, for any particular wavelength in the tuning range. The other crystal is in an inactive state and acts as a beam displacement compensator of the beam. By using two different phase matching angles $\theta 1$ and $\theta 2$, a much larger wavelength range is possible without having to remove and insert different optical elements into frequency conversion device 22. A suitable tunable wavelength range is about 450 nm to 225 nm, as obtained by frequency doubling 900 to 450 nm input wavelengths.

Frequency conversion device 22 is suitable for second harmonic generation, sum frequency mixing, difference frequency mixing, and it can be included in the resonator of an optical parametric device.

Crystals 28 and 32 can be made of the same or different materials. Suitable materials include but are not limited to BBO, KD*P, KTP, LBO and the like.

A range of different phase matching angles θ1 and θ2 are possible. Preferred angles are from approximately 25 to 75 degrees in Type I cut BBO.

Additionally, a range of different stage angles α1 and α2 are possible. Preferable angles would cover a range of about plus or minus 15 degrees.

While only frequency conversion crystal 28 or 32 is active for a particular wavelength in the range, the other crystal remains inactive. The combination of displacement, refractive, and beam displacement compensation provided by frequency conversion device 22 minimizes beam shift as the system is tuned in wavelength.

Figure 3:
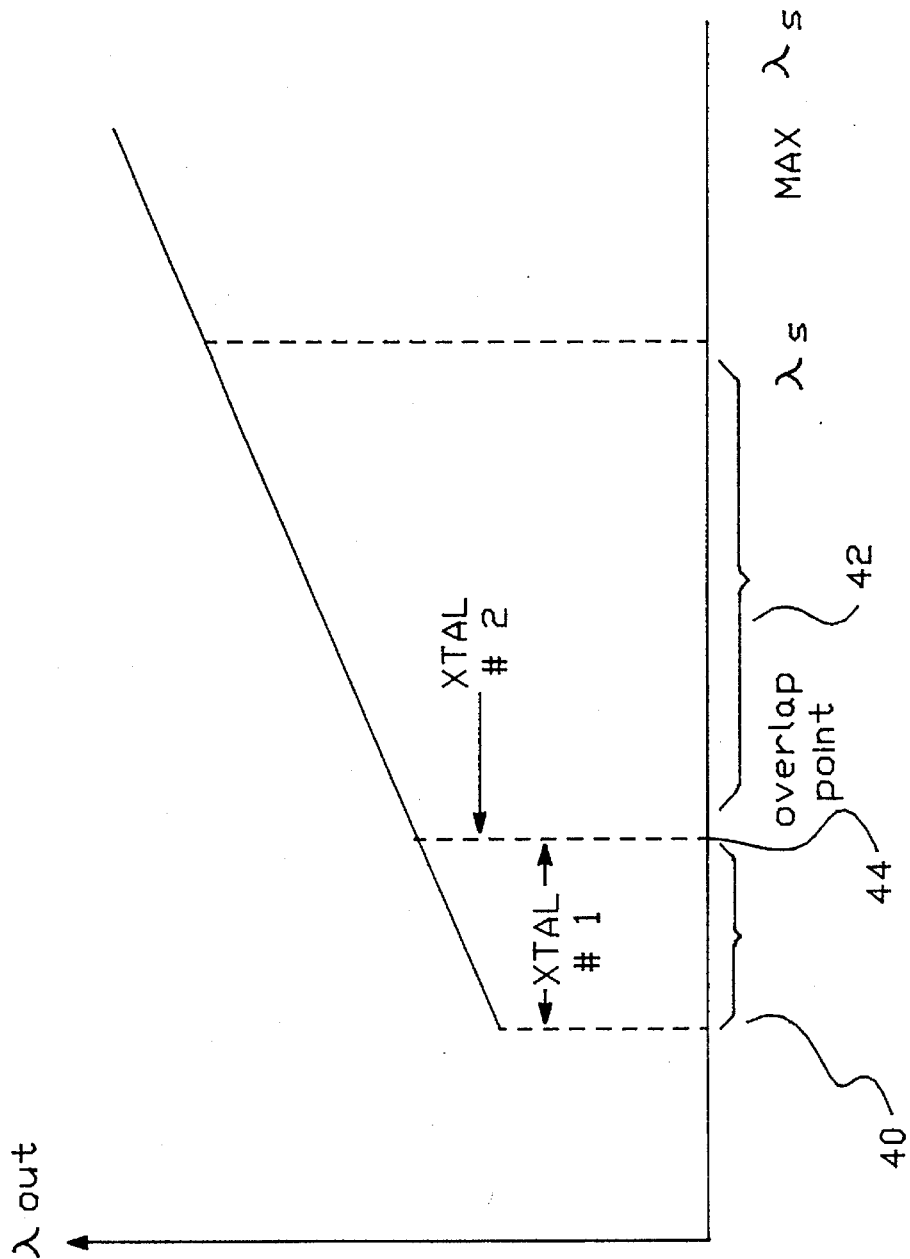
FIG. 3 is a graphical representation of the invention illustrating that one crystal is active in one section of a desired tuning range, and the other crystal is active in a different second section of the desired tuning range.

To establish the operation of frequency conversion device 22, a desired wavelength range for each of crystals 28 and 32 is selected, and where the two ranges meet, or overlap, a decision is made as to which of the crystals will operate in all or part of the overlap. This is illustrated in FIGS. 3 and 4. In FIG. 3, second harmonic generation is illustrated. Crystal 28 operates in wavelength region denoted as 40, and crystal 32 operates in wavelength region 42. At overlap point 44, one of the crystals is selected to operate. This again provides that at any selected tuning wavelength in the range, only one of the crystals is active.

Referring now to FIG. 4, a graph plotting tuning wavelength range, comprised of wavelengths represented as λ1 for crystal 28, and wavelengths represented as λ2 for crystal 32, against stage angle θ is presented. A tuning curve 46 represents a range of frequencies, generally designated as λ1 for crystal 28, while a tuning curve 48 represents a range of frequencies, generally designated as λ2 for crystal 32. Curves 46 and 48 overlap, and there is a continuity of tuning range wavelengths. However, only one of crystals 28 or 32 provides wavelength tuning in overlap region 50. Both crystals can tune in portions of overlap region 50. However, for any particular wavelength for a frequency conversion process, the choice of stage angle assures that only one crystal is active. It should be noted that one of the crystals can be active at a particular wavelength for one frequency conversion process, while the other crystal can be active at that wavelength for a different frequency conversion process, if desired.

Figure 5:
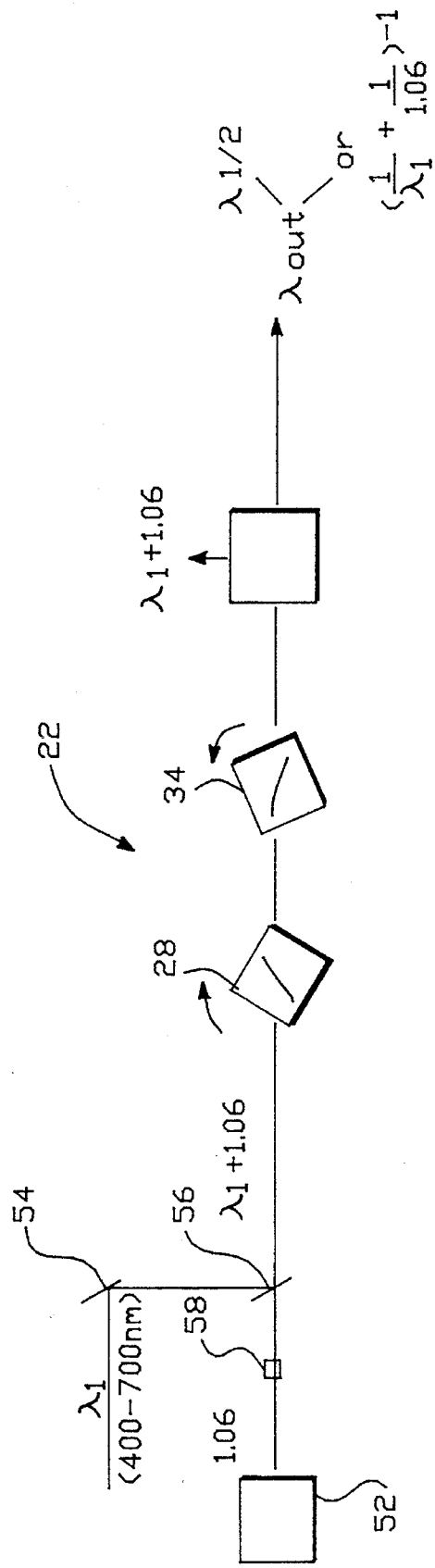
FIG. 5 is a schematic diagram of the invention with two input beams.
Figure 6:
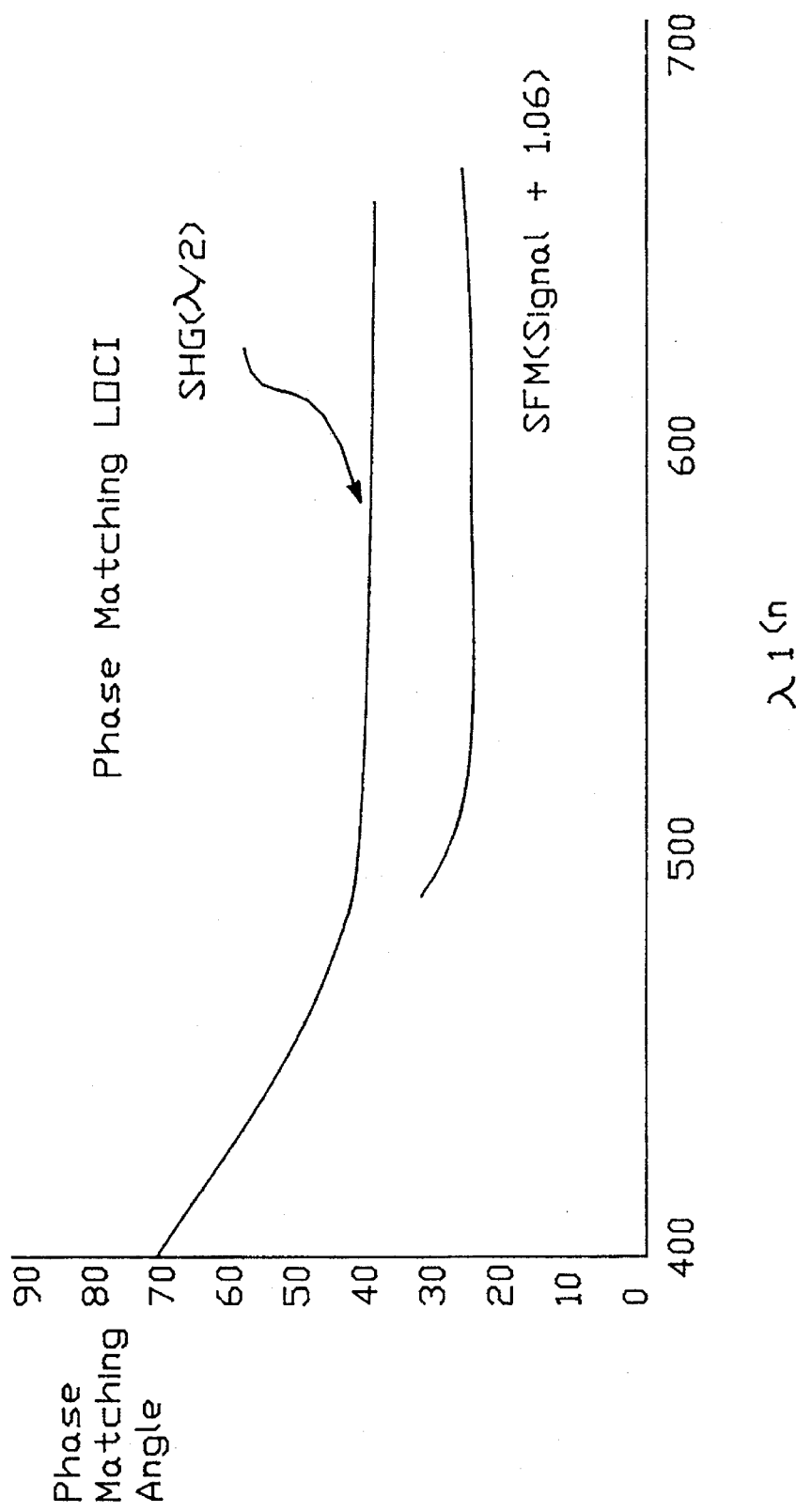
FIG. 6 is a graphical representation showing that the invention can be used with one or more phase matching processes.

A specific example of a frequency conversion device 22 is illustrated in FIG. 5. In one embodiment, frequency conversion crystals 28 and 32 are made of BBO Type I. Crystal 28 is cut at a phase matching angle of 36 degrees, and crystal 32 is cut at a phase matching angle of 56 degrees. This was found to be sufficient to provide second harmonic generation outputs from a Quanta Ray Model 730 MOPO, Spectra-Physics Lasers, Mountain View, Calif., over a wavelength range of 430 to 690 nm. The corresponding output wavelengths ranged from 215 to 345 nm.

The tuning range can be extended to longer wavelengths, above 345 nm, by sum frequency mixing selective signal wavelengths with residual 1.06 light from the OPO pump laser 52, which can be a Nd:YAG laser, or by frequency doubling of the idler output. For an input wavelength λ1 of 500 to 690 nm, by sum frequency mixing with a 1.06 input beam in Type I BBO, output wavelengths in the range of 340 to 420 nm are obtained with phase matching angles of 27 to 33 degrees. To implement the sum frequency mixing scheme of frequency conversion device 22, with crystals 28 and 32, two visible dichroic mirrors 54 and 56 are included. Each crystal was 7×10×6 mm in size. Mirrors 54 and 56 reflect visible light and transmit the IR. Also included is a half wave plate 58. In this embodiment, only crystal 32 is active at the appropriate wavelengths for the sum frequency mixing process, and the second harmonic generation process can still take place in the presence of the 1.06 beam. It is, however, necessary to select a different stage angle for second harmonic generation verses sum frequency mixing. With frequency conversion device 22 of FIG. 5, by utilizing a combination of second harmonic generation, and sum frequency mixing, it is possible, with the inclusion of crystals 28 and 32, to cover an output wavelength range of 215 to 420 nm simply by varying λ1 and the stage angles of crystals 28 and 32.

A comparison of second harmonic generation and sum frequency mixing processes, as conducted with frequency conversion device 22 of FIG. 5, is made. Phase matching loci are single valued functions of λ1, i.e., there is a unique angle for a given λ1 at which either second harmonic generation or sum frequency mixing (but not both) will occur. It is this single valued characteristic (no intersecting curves on the phase matching plot) that makes the second harmonic generation/sum frequency mixing scheme workable and avoids the need to switch different input wavelengths in and out of the beam line.

Figure 7:
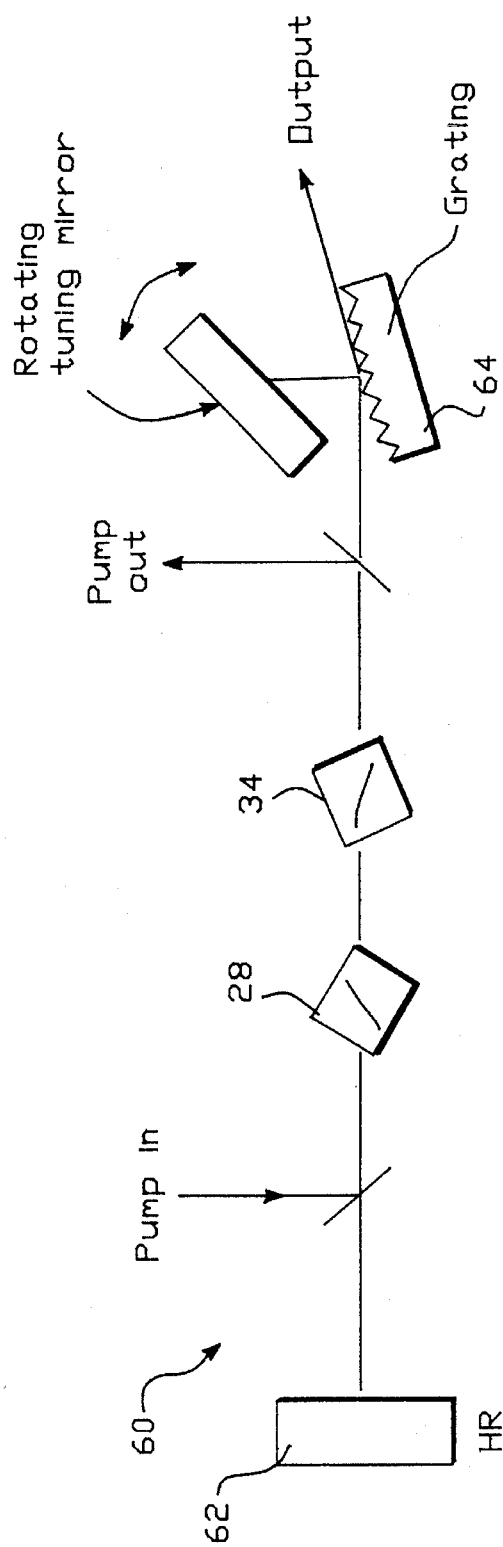
FIG. 7 is a schematic diagram of the invention as it is used in an optical parametric oscillator.

In FIG. 7, an optical oscillator 60 is defined by a high reflector 62 and a wavelength selective output coupler 64. Disposed within oscillator 60 are crystals 28 and 32. In one embodiment, crystal 28 phase matches for the parametric frequency conversion process, and crystal 32 acts as a beam displacement compensator over one section of a desired tuning range. Crystal 32 phase matches over a second section of the range with crystal 28 then serving a beam displacement compensator. The particular wavelength selected by the dispersive cavity elements determines which crystal is active in the parametric generation process. It will be appreciated by those skilled in the art that oscillator 60 can be modified to include alternative dispersive elements, and the mirror and/or pumping arrangements can be modified.

Crystals 28 and 32 are positioned on crystal holders on mechanical stages. The mechanical stages are rotatable and synchronized with each other. The synchronization can be achieved mechanically with the use of a connect belt or band that connects the stages. Alternatively, software and hardware (collectively "resources") can be used to implement the movement and selection of the crystal to be active under a given set of conditions including but not limited to input wavelength and the particular phase matching angle. A computer or controller can also be utilized to determine which portion of the overlap section will be associated with which crystal. A computer associated with the frequency conversion apparatus of the invention can include a CPU coupled through a system bus. On this system can be included a keyboard, a disk drive, or other non-volatile memory systems, a display, and other peripherals, as known in the art. Also coupled to the bus can be a program memory and a data memory which stores a look-up table of values which provides the association of the desired output frequency with input frequency, phase matching angle and stage angle. The computer look up table specifies a one-to-one relationship between input wavelength and stage angle (see FIG. 4) for whatever type of frequency conversion process being generated. By knowing the input wavelength, the control system can drive the stage angle to the proper position for optimum phase matching in one or the other of the two crystals.

Figure 8:
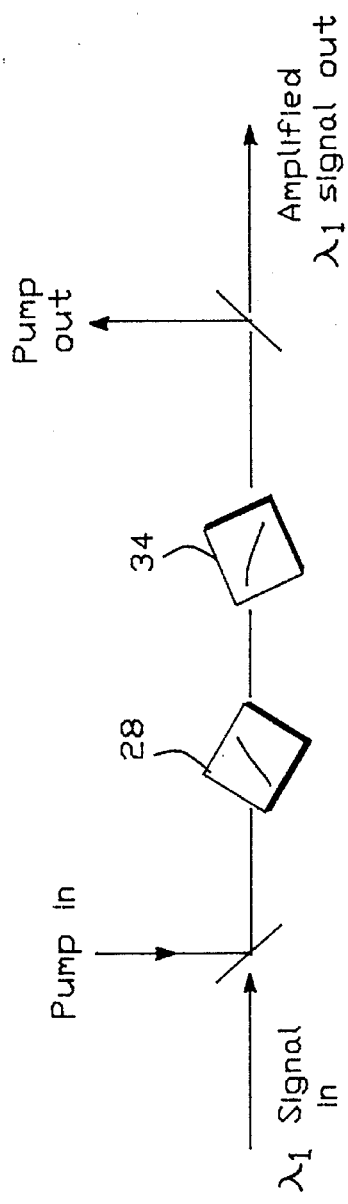
FIG. 8 is a schematic diagram of the invention as it is used in an optical parametric amplifier.

FIG. 8 illustrates an example of employing the active/ passive scheme in an optical parametric amplifier. In this case, the active crystal is determined by the value of $\lambda 1$, the input signal to be applied.

Figure 9:
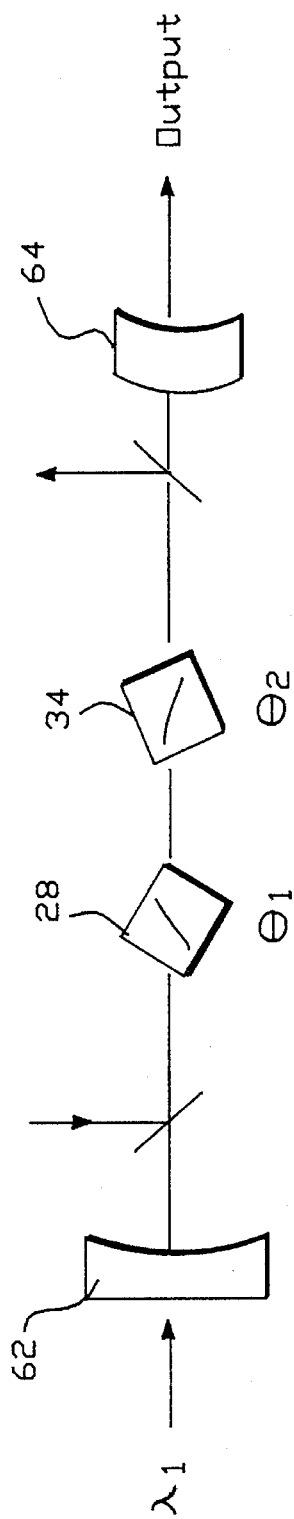
FIG. 9 is a schematic diagram of the invention with four frequency conversion crystals.

FIG. 9 illustrates the active/passive crystal scheme as applied to an injection seeded optical parametric oscillator, where $\lambda 1$ is the injected wavelength that determines which of the crystals is active in the resonator.

Figure 10:
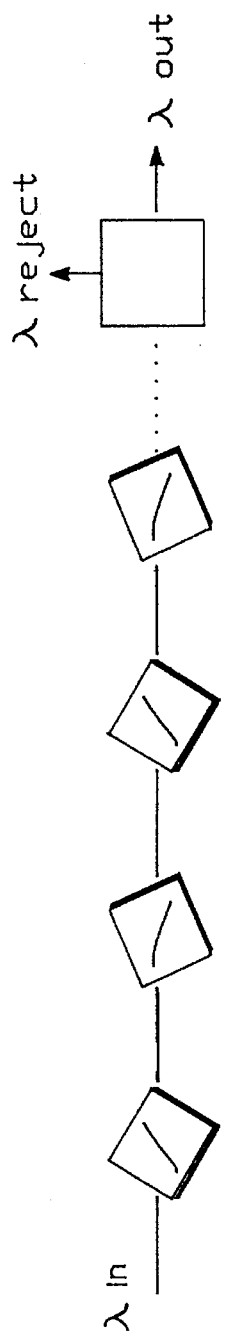
FIG. 10 is a schematic diagram of the invention with two frequency conversion crystals on the same line.

More than two frequency conversion crystals can be included in the beam line, as shown in FIG. 10. Additionally, the crystals need not be on the same beam line and folding optics can be employed anywhere along the beam path.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

I claim:

1. A non-linear frequency conversion device for a selected tuning range, comprising:

an input source providing a first input beam of frequency $\lambda 1$ along an optical axis;

a first frequency conversion crystal with an input beam face cut at an angle $\theta 1$ and positioned on a first stage at a stage angle $\alpha 1$ along the optical axis, the first frequency conversion crystal providing frequency conversion of the first input beam of frequency $\lambda 1$ to a selected frequency $\lambda 2$ of a first portion of the selected tuning range; and a second frequency conversion crystal with an input beam face cut at an angle $\theta 2$ and positioned on a second stage at a stage angle $\alpha 2$ along the optical axis, the second frequency conversion crystal providing frequency conversion of the first input beam of frequency $\lambda 1$ to a selected frequency $\lambda 3$ of a second portion of the selected tuning range, wherein the first and second frequency conversion crystals provide non-simultaneous frequency conversion.

2. The frequency conversion device of claim 1, wherein only one of the first and second frequency conversion crystals provides frequency conversion at a tuning wavelength in the range, while the other frequency conversion crystal serves as a beam displacement compensator.

3. The frequency conversion device of claim 1, wherein each frequency conversion crystal is made of the same material.

4. The frequency conversion device of claim 1, wherein each frequency conversion crystal is made of a different material.

5. The frequency conversion device of claim 1, wherein the first frequency conversion crystal provides frequency doubling of the first input beam of frequency $\lambda 1$ to a frequency $\lambda 2$, and the second frequency conversion crystal provides compensation for beam displacement.

6. The frequency conversion device of claim 1, wherein the second frequency conversion crystal provides frequency doubling of the first input beam of frequency $\lambda 1$ to a frequency $\lambda 3$, and the first frequency conversion crystal provides compensation for beam displacement.

7. The frequency conversion device of claim 1, further comprising:

a second input source providing a second input beam of frequency $\lambda 4$.

8. The frequency conversion device of claim 7, wherein the first frequency conversion crystal provides sum frequency mixing of the first input beam of frequency $\lambda 1$ and the second input beam of frequency $\lambda 4$, and the second frequency conversion crystal provides compensation for beam displacement.

9. The frequency conversion device of claim 7, wherein the second frequency conversion crystal provides sum frequency mixing of the first input beam of frequency $\lambda 1$ and the second input beam of frequency $\lambda 4$, and the first frequency conversion crystal provides compensation for beam displacement.

10. The frequency conversion device of claim 7, wherein the first frequency conversion crystal provides difference frequency mixing of the first input beam of frequency $\lambda 1$ and the second input beam of frequency $\lambda 4$, and the second frequency conversion crystal provides compensation for beam displacement.

11. The frequency conversion device of claim 7, wherein the second frequency conversion crystal provides difference frequency mixing of the first input beam of frequency $\lambda 1$ and the second input beam of frequency $\lambda 4$, and the first frequency conversion crystal provides compensation for beam displacement.

12. The frequency conversion device of claim 7, wherein the first frequency conversion crystal provides two or more frequency conversion functions at frequencies in the first portion of the selected tuning range, and the second crystal provides two or more frequency conversion functions at frequencies in the second portion of the selected tuning range.

13. The frequency conversion device of claim 1, wherein the first frequency conversion crystal and the second frequency conversion crystal are positioned along different optical axes.

14. The frequency conversion device of claim 1, wherein the input source provides the first input beam along a different optical axis than the first and second frequency conversion crystals.

15. The frequency conversion device of claim 1, wherein each of the first and second frequency conversion crystals is made of BBO.

16. The frequency conversion device of claim 1, further comprising:

a stage movement device that synchronizes movement of the first and second stages.

17. The frequency conversion device of claim 16, wherein the first and second stages move in a rotational movement.

18. A non-linear frequency conversion device for a selected tuning range made of a first section, a second section and an overlapping first and second section, comprising:

an input source providing a first input beam of frequency $\lambda 1$;

a first frequency conversion crystal with an input beam face cut at an angle $\theta 1$ and positioned on a first stage at a stage angle $\alpha 1$, the first frequency conversion crystal providing frequency conversion of the first input beam of frequency $\lambda 1$ to a selected frequency $\lambda 2$ of the first section of the selected tuning range;

a second frequency conversion crystal with an input beam face cut at an angle $\theta 2$ and positioned on a second stage at a stage angle α2, the second frequency conversion crystal providing frequency conversion of the first input beam of frequency λ1 to a selected frequency λ3 of the second section of the selected tuning range; and wherein the first and second frequency conversion crystals provide non-simultaneous frequency conversion, and only one of the first or second conversion crystals provides frequency conversion to a selected frequency λ2 for the first conversion crystal or λ3 for the second conversion crystal, in all or a portion of the overlapping first and second sections of the tuning range.

19. The frequency conversion device of claim 18, wherein only one of the first and second frequency conversion crystals provides frequency conversion at a tuning wavelength in the range, while the other frequency conversion crystal serves as a beam displacement compensator.

20. The frequency conversion device of claim 18, wherein each frequency conversion crystal is made of the same material.

21. The frequency conversion device of claim 18, wherein each frequency conversion crystal is made of a different material.

22. The frequency conversion device of claim 18, wherein the first frequency conversion crystal provides frequency doubling of the first input beam of frequency λ1 to a frequency λ2, and the second frequency conversion crystal provides compensation for beam displacement.

23. The frequency conversion device of claim 18, wherein the second frequency conversion crystal provides frequency doubling of the first input beam of frequency λ1 to a frequency λ3, and the first frequency conversion crystal provides compensation for beam displacement.

24. The frequency conversion device of claim 18, further comprising:

a second input source providing a second input beam of frequency λ4.

25. The frequency conversion device of claim 24, wherein the first frequency conversion crystal provides sum frequency mixing of the first input beam of frequency λ1 and the second input beam of frequency λ4, and the second frequency conversion crystal provides compensation for beam displacement.

26. The frequency conversion device of claim 24, wherein the second frequency conversion crystal provides sum frequency mixing of the first input beam of frequency λ1 and the second input beam of frequency λ4, and the first frequency conversion crystal provides compensation for beam displacement.

27. The frequency conversion device of claim 24, wherein the first frequency conversion crystal provides difference frequency mixing of the first input beam of frequency λ1 and the second input beam of frequency λ4, and the second frequency conversion crystal provides compensation for beam displacement.

28. The frequency conversion device of claim 24, wherein the second frequency conversion crystal provides difference frequency mixing of the first input beam of frequency λ1 and the second input beam of frequency λ4, and the first frequency conversion crystal provides compensation for beam displacement.

29. The frequency conversion device of claim 24, wherein the first frequency conversion crystal provides two or more frequency conversion functions at frequencies in the first section of the selected tuning range, and the second crystal provides two or more frequency conversion functions at frequencies in the second section of the selected tuning range.

30. The frequency conversion device of claim 18, wherein each of the first and second frequency conversion crystals is made of BBO.

31. The frequency conversion device of claim 18, further comprising:

a stage movement device that synchronizes movement of the first and second stages.

32. The frequency conversion device of claim 31, wherein the first and second stages move in a rotational movement.

33. An optical parametric device with a selected tuning range, comprising:

a device to establish a first input of a frequency of the selected tuning range;

a first frequency conversion crystal with an input beam face cut at an angle θ1 and positioned on a first stage at a stage angle α1 mounted in the optical parametric device, the first frequency conversion crystal providing parametric generation for a first section of the selected tuning range; and a second frequency conversion crystal with an input beam face cut at an angle θ2 and positioned on a second stage at a stage angle α2 mounted in the optical parametric device, the second frequency conversion crystal providing parametric generation for a second section of the selected tuning range which is different from the first section of the selected tuning range.

* * * * *